US007524793B2

(12) United States Patent
Orth-Gerber et al.

(10) Patent No.: US 7,524,793 B2
(45) Date of Patent: Apr. 28, 2009

(54) TITANIUM DIOXIDE PHOTOCATALYST CONTAINING CARBON AND METHOD FOR ITS PRODUCTION

(75) Inventors: Jürgen Orth-Gerber, Much (DE); Horst Kisch, Erlangen (DE); Sakthivel Shanmugasundaram, Erlangen (DE)

(73) Assignee: Kronos International Inc, Leverkusen (DE)

( * ) Notice: Subject to any disclaimer, the term of this patent is extended or adjusted under 35 U.S.C. 154(b) by 482 days.

(21) Appl. No.: 11/095,817

(22) Filed: Apr. 1, 2005

(65) Prior Publication Data

US 2005/0227854 A1    Oct. 13, 2005

(30) Foreign Application Priority Data

| Apr. 7, 2004 | (DE) | ................. 10 2004 017 565 |
| Apr. 7, 2004 | (DE) | ................. 20 2004 005 677 U |
| Jun. 4, 2004 | (DE) | ................. 10 2004 027 549 |

(51) Int. Cl.
*B01J 23/00* (2006.01)
*C01G 23/047* (2006.01)
*B05D 7/00* (2006.01)

(52) U.S. Cl. .............. 502/350; 502/349; 423/610; 423/614; 423/445 R; 427/215

(58) Field of Classification Search ............ 502/100, 502/216, 350, 219, 221, 223, 349; 423/82, 423/85, 414, 445 R, 608, 610–612, 613–616; 427/215–218
See application file for complete search history.

(56) References Cited

U.S. PATENT DOCUMENTS

| 2,448,683 | A | * | 9/1948 | Peterson ................. 423/616 |
| 5,484,757 | A | * | 1/1996 | Szymanski et al. ........ 502/439 |
| 6,306,343 | B1 | * | 10/2001 | Sugiyama ................ 422/4 |
| 6,365,007 | B1 | * | 4/2002 | Willner et al. ........ 204/157.15 |
| 6,827,922 | B2 | * | 12/2004 | Sawabe et al. ............ 423/610 |
| 2004/0037772 | A1 | * | 2/2004 | Sawabe et al. ............ 423/610 |

(Continued)

FOREIGN PATENT DOCUMENTS

EP    0 498122    8/1992

(Continued)

OTHER PUBLICATIONS

Sakthivel et al., "Daylight Photocatalysis by Carbon-Modified Titanium Dioxide," Angewandte Chemie International Edition 2003, 42, 4908-4911.*

(Continued)

*Primary Examiner*—Steven Bos
*Assistant Examiner*—Anthony J Zimmer
(74) *Attorney, Agent, or Firm*—Rodney T Hodgson (57) ABSTRACT

The invention relates to a titanium dioxide-based photocatalyst containing carbon that is highly photoactive in visible light (vlp-$TiO_2$) and to a method of manufacture. The vlp-$TiO_2$ is manufactured by mixing a fine grained titanium compound (BET$\geq$50 $m^2/g$) with an organic carbon compound and subsequent thermal treatment at temperatures up to 350° C. The carbon content amounts to 0.05 to 4% by weight, preferably 0.4 to 0.8% by weight. The product is characterized by an ESR spectrum which displays only one significant signal in the g value range from 1.97 to 2.05 at g about 2.003. The inventive photocatalyst can be used for to degrade contaminants and pollutants in liquids and gases.

19 Claims, 11 Drawing Sheets

U.S. PATENT DOCUMENTS

2004/0058149 A1 * 3/2004 Zhou et al. .................. 428/328

FOREIGN PATENT DOCUMENTS

| EP | 0 963789 | | 12/1999 |
|---|---|---|---|
| GB | 1022621 | * | 4/1966 |
| JP | 11333304 A | * | 12/1999 |

OTHER PUBLICATIONS

Choi et al., "Fabrication and characterization of C-doped anatase TiO2 photocatalysts," Journal of Materials Science 39, (2004), 1837-1839.*

Lettmann et al., "Visible light photodegradation of 4-chlorophenol with a coke-containing titanium dioxide photocatalyst," Applied Catalysis B: Enviornmental 32 (2001) 215-227.*

* cited by examiner

TITANIUM DIOXIDE PHOTOCATALYST CONTAINING CARBON AND METHOD FOR ITS PRODUCTION

The invention relates to a titanium dioxide-based photocatalyst containing carbon that is photoactive in the visible range, also referred to as vlp-$TiO_2$ below.

The invention further relates to a method for producing a titanium dioxide containing carbon (vlp-$TiO_2$) that is effective as a photocatalyst when irradiated with visible light.

Photocatalytic materials are semiconductors in which, when exposed to light, electron-hole pairs develop, which generate highly reactive free radicals on the material surface. Titanium dioxide is a semiconductor of this kind. It is known that titanium dioxide is capable of removing natural and artificial contaminants in air and water by irradiation with UV light, in that the atmospheric oxygen is reduced and the contaminants oxidized (mineralized) into environmentally friendly end products. In addition, the surface of titanium dioxide becomes superhydrophilic as a result of absorbing UV light. This is the basis of the anti-fogging effect of thin titanium dioxide films on mirrors and windows.

One serious disadvantage of titanium dioxide is the fact that it can only utilize the UV component of sunlight, i.e. only 3 to 4% of the radiation, and displays either only very weak catalytic activity, or none at all, in diffuse daylight.

Consequently, attempts have for some time been made to modify titanium dioxide in such a way that it can also utilize the main component of photochemically active sunlight—the visible spectral range between roughly 400 nm and roughly 700 nm—to produce the above-mentioned phenomena.

One way of making $TiO_2$ photocatalytically active in daylight is to dope it with metal ions, such as V, Pt, Cr or Fe. Another possibility is to create oxygen vacancies in the $TiO_2$ crystal lattice by reduction of $Ti^{4+}$. Both developments require complex production techniques, such as ion implantation or plasma treatment.

Numerous patents describe nitrogen-modified titanium dioxide that is photocatalytically active when irradiated in the visible range (e.g. EP 1 178 011 A1, EP 1 254 863 A1).

It is furthermore known that modification with carbon increases the photocatalytic activity of titanium dioxide when irradiated with visible light. For example, JP 11333304 A describes a titanium dioxide whose surface at least partly displays a precipitate of graphite, amorphous carbon, diamond-like carbon or hydrocarbons. EP 0 997 191 A1 reports on a titanium dioxide with titanium carbide applied to its surface by means of vapor-phase deposition.

Photocatalytic materials in which titanium dioxide contains, inter alia, nitrogen, sulfur, carbon or other elements as anions, are disclosed in EP 1 205 244 A1 and EP 1 205 245 A1, for example. The anions are said to be located either at oxygen sites, at interstitial sites or at the grain boundaries of a polycrystalline titanium oxide particle. No information is given as regards the characterization of the material and about catalytic or physical properties. The production of titanium dioxide containing 1.0 to 1.7% by weight carbon from titanium alcoholates by hydrolysis with hydrochloric acid and subsequent heating to 350° C. is also known (C. Lettmann et al., Applied Catalysis B 32 (2001) 215). In this case, the carbon originates from the ligand of the titanium compound.

According to a further publication, it has been found that hydrolysis of titanium tetrachloride with tetrabutylammonium hydroxide, followed by calcination for one hour at 400° C., yields a titanium dioxide preparation containing 0.42% by weight carbon (S. Sakthivel & H. Kisch, Angew. Chem. Int. Ed. 42 (2003) 4908). In this case, the carbon originates from the precipitant and is presumably dispersed relatively uniformly in the volume (volume doping).

The disadvantage of the known photocatalytic materials is that the methods for producing them are not suitable for industrial-scale production. Either the methods cannot be realized on an industrial scale for technical reasons, or they would then no longer be economical. In addition, most of the products obtained display insufficient photocatalytic activity in the degradation of pollutants in visible light in the range of $\lambda \geq 400$ nm, and an only slight light-induced increase in hydrophilicity.

Moreover, the products have so far only been optimized in respect of their photocatalytic properties. The color and brightness, i.e. the optical properties, have been disregarded to date. However, use of a very bright vlp-$TiO_2$ with little inherent color and high photocatalytic activity has advantages in all applications that tolerate only little or no inherent color of the vlp-$TiO_2$, such as applications in coatings, specifically in paints and plasters.

The object of the invention is to provide a daylight-active, highly effective photocatalyst on the basis of a carbon-modified titanium dioxide, and to specify an economical method for producing it.

According to the invention, the object is solved by a titanium dioxide containing carbon which, compared to pure titanium dioxide, displays significant light absorption in the range of $\lambda \geq 400$ nm (vlp-$TiO_2$) and whose electron spin resonance (ESR) spectrum measured at a temperature of 5 K displays only one significant signal in the g value range from 1.97 to 2.05.

The object is further solved by a production method in which a titanium compound having a specific surface area of at least 50 $m^2$/g according to BET (Brunauer-Emmett-Teller) is mixed intimately with a carbon containing compound, and the mixture is treated thermally at a temperature of up to 400° C.

Further advantageous developments of the invention are indicated in the sub-claims.

Product

The vlp-$TiO_2$ according to the invention displays greater photocatalytic activity than the types described in the prior art. The measure of photocatalytic activity (hereinafter referred to as "photoactivity") is the degradation of 4-chlorophenol by a defined quantity of vlp-$TiO_2$ during 120-minute irradiation with light having a wavelength $\lambda$ of $\geq 455$ nm. The measuring method is described in detail below. Under the specified measuring conditions, the photoactivity of the vlp-$TiO_2$ according to the invention is in the region of at least 20%, preferably in the region of at least 40%, particularly in the region of at least 50%.

The carbon content is in the range from 0.05 to 4% by weight, referred to $TiO_2$, preferably 0.05 to 2.0% by weight, and particularly preferably 0.3 to 1.5% by weight. The best results are obtained with carbon contents of 0.4 to 0.8% by weight.

The titanium dioxide particles contain carbon in a surface layer only, and are thus referred to as "carbon-modified" below—as opposed to the volume-doped titanium dioxide produced according to Sakthivel and Kisch (2003). The carbon or carbon compounds of the vlp-$TiO_2$ according to the invention are presumably primarily covalently bonded to the $TiO_2$ surface via oxygen, and alkaline-leachable.

The photocatalyst can additionally contain nitrogen.

In contrast to unmodified $TiO_2$, the vlp-$TiO_2$ according to the invention absorbs visible light with a wavelength $\lambda \geq 400$ nm. In this context, compared to the value at 400 nm, the Kubelka-Munk function $F(R_\infty)$, which is proportional to the absorbancy, is roughly 50% at 500 nm and roughly 20% at 600 nm.

The electron spin resonance (ESR) spectrum of the vlp-$TiO_2$ according to the invention, measured at a temperature of 5 K, is characterized by a strong signal at a g value of 2.002 to 2.004, particularly 2.003. No further signals occur in the g value range from 1.97 to 2.05. The intensity of the signal at a g value of roughly 2.003 is increased by irradiation with light having a wavelength of $\lambda \geq 380$ nm (UV-free 100 W halogen lamp, KG5 cold-light filter), compared to the measurement in darkness.

The X-ray photoelectron spectrum (XPS) of the vlp-$TiO_2$ according to the invention is characterized by the occurrence of a strong absorption band at a bond energy of 285.6 eV, referred to the O1s band at 530 eV.

A further characteristic is that, in contrast to the photocatalyst according to Sakthivel & Kisch (2003), the vlp-$TiO_2$ does not display carbonate bands, either in the X-ray photoelectron spectrum (XPS), or in the infrared spectrum.

When irradiated with visible light, the vlp-$TiO_2$ displays a water contact angle of roughly 8°, whereas unmodified $TiO_2$ displays a contact angle of roughly 21°.

The new photocatalyst enables pollutant degradation not only using artificial visible light, but also with diffuse, indoor daylight. It can be used to degrade contaminants and pollutants in liquids or gases, particularly in water and air.

The photocatalyst can advantageously be applied to various substrates, such as glass (plain and metallized), wood, fibers, ceramics, concrete, building materials, $SiO_2$, metals, paper and plastics, in the form of a thin layer. In combination with its simple production, this thus opens up potential applications in a wide variety of sectors, e.g. in the construction, ceramics and automotive industries for self-cleaning surfaces, or in environmental engineering (air-conditioning equipment, devices for air purification and air sterilization, and in the purification of water, especially drinking water) as well as for antibacterial and antiviral purposes. The photocatalyst can be used in coatings for interior and exterior purposes, such as paints, plasters and glazes for application to masonry, plaster surfaces, paint coats, wallpapers and wood, metal, glass or ceramic surfaces, or to components, such as composite heat insulation systems and curtain-wall facade elements, as well as in road surfacings and in plastics, plastic sheeting, fibers and paper. The photocatalyst can moreover be used in the production of prefabricated concrete elements, concrete paving stones, roof tiles, ceramics, decorative tiles, wallpapers, fabrics, panels and cladding elements for ceilings and walls in indoor and outdoor areas.

The light-induced increase in the hydrophilicity of the $TiO_2$ surface gives rise to additional applications, such as non-fogging mirrors and windows in the sanitary sector or in the automotive and construction industries.

The photocatalyst is moreover suitable for use in photovoltaic cells and for photolysis.

The vlp-$TiO_2$ according to the invention is described in more detail below with reference to FIGS. 1-11.

Figure 1:
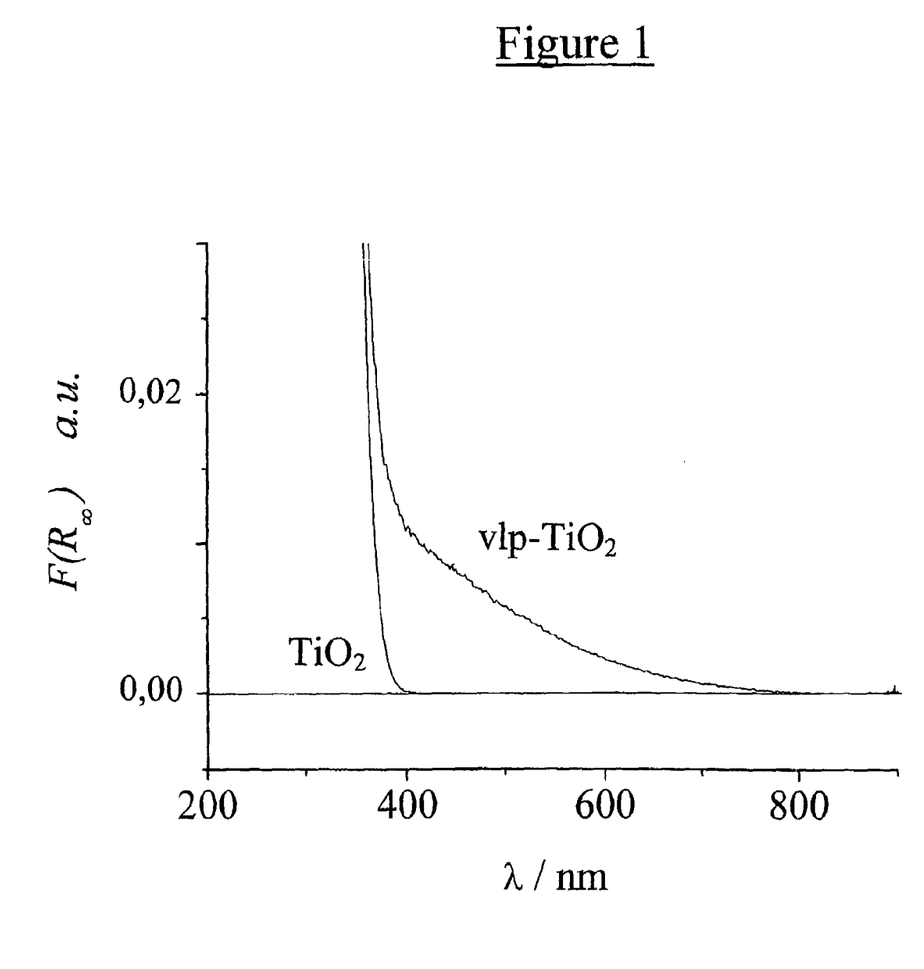
FIG. 1 shows the Kubelka-Munk function $F(R_\infty)$ (arbitrary units), which is proportional to the relative absorbancy, for unmodified $TiO_2$ and for C-modified $TiO_2$ (vlp-$TiO_2$) as a function of the wavelength, and indicates that, in contrast to unmodified titanium dioxide, the vlp-$TiO_2$ absorbs in the visible spectral range. $F(R_\infty)$ is roughly 50% at 500 nm and roughly 20% at 600 nm compared to the value at 400 nm.
Figure 2:
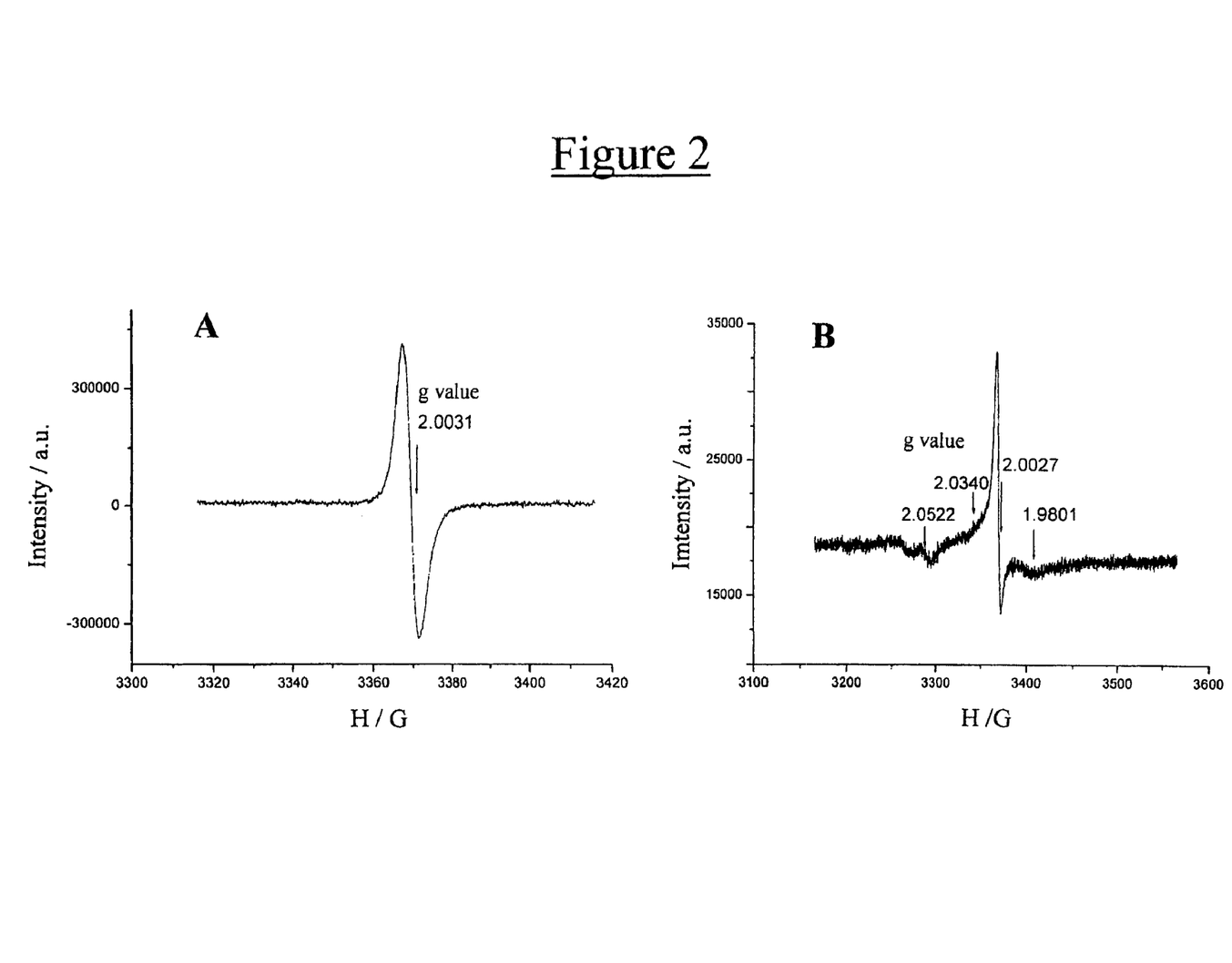
FIG. 2 shows the electron spin resonance (ESR) spectra of the vlp-$TiO_2$ according to the invention (spectrum A) and of the $TiO_2$ produced according to Sakthivel & Kisch (spectrum B), recorded in darkness at a temperature of 5 K. Spectrum A displays only one significant signal at a g value of 2.003. In addition to the principal signal at a g value of roughly 2.003, spectrum B displays three further signals in the g value range from 1.97 to 2.05.
Figure 3:
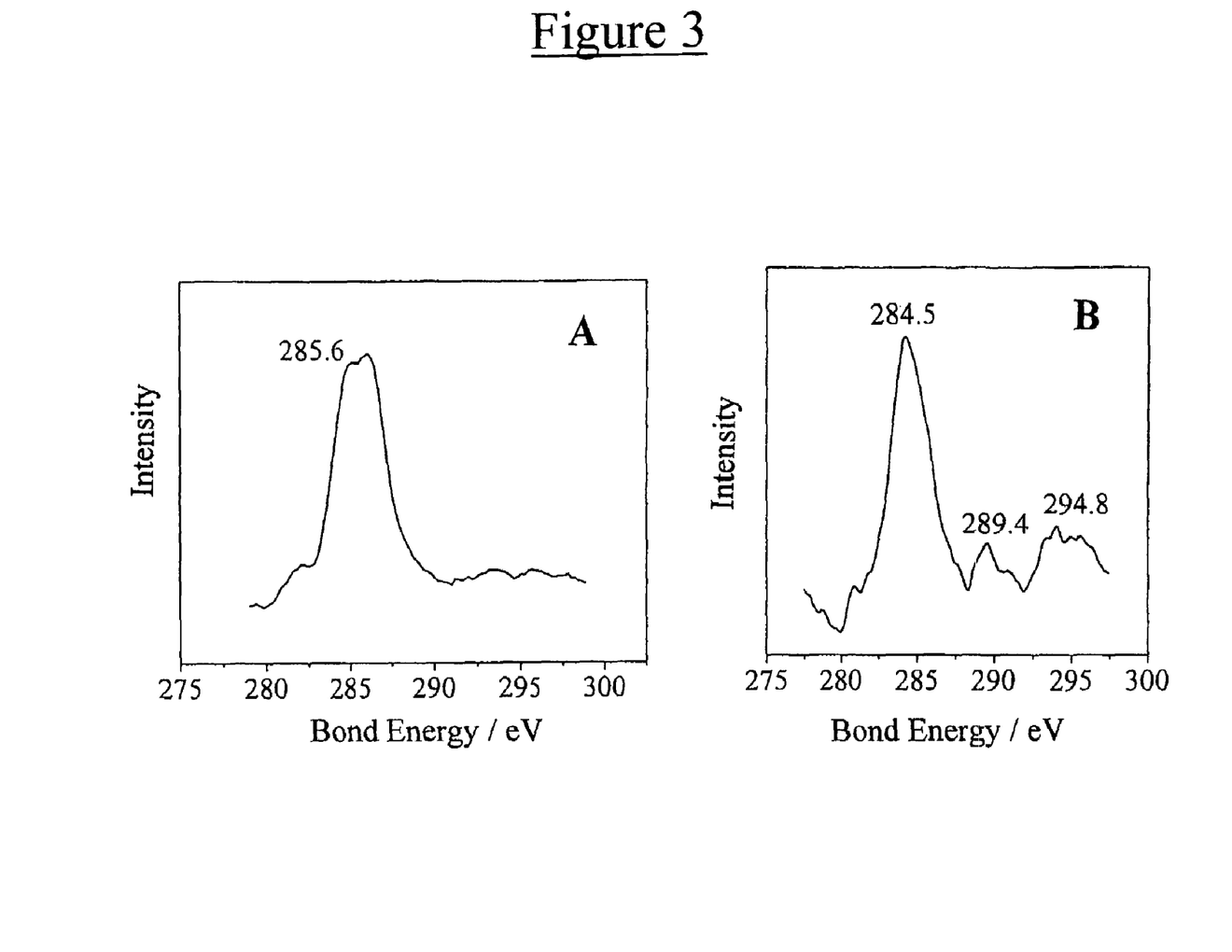
FIG. 3 contains the X-ray photoelectron spectra (XPS) of the vlp-$TiO_2$ according to the invention (spectrum A) and of the previously known $TiO_2$ according to Sakthivel & Kisch, precipitated from titanium tetrachloride with tetrabutylammonium hydroxide (spectrum B). The spectrum of the vlp-$TiO_2$ displays a pronounced C1s signal at a bond energy of 285.6 eV, referred to the O1s absorption band at 530 eV, this indicating elementary carbon. In contrast, spectrum B displays C1s signals for elementary carbon at a bond energy of 284.5 eV, as well as additional bands at 289.4 eV and 294.8 eV, these indicating carbonate. Corresponding IR spectra likewise display typical carbonate bands at 1738, 1096 and 798 $cm^{-1}$.
Figure 4:
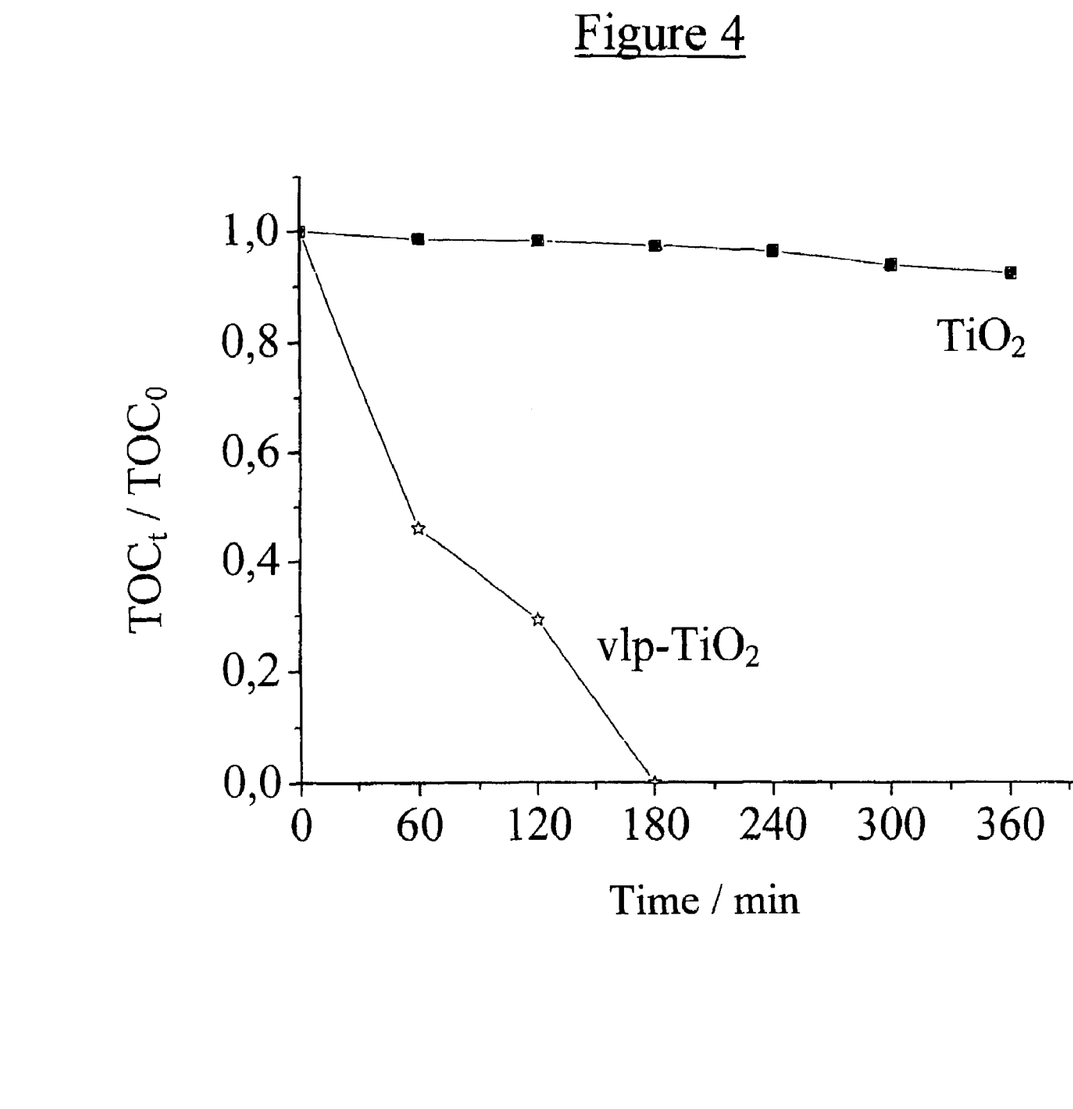
FIG. 4 illustrates the photocatalytic activity of vlp-$TiO_2$ compared to unmodified $TiO_2$ in the degradation of 4-chlorophenol (in the form of a $2.5 \times 10^{-4}$ molar aqueous solution) by means of artificial visible light ($\lambda \geq 455$ nm). The diagram presents the decrease in the total content of organic carbon ($TOC_t$) in the solution relative to the starting value ($TOC_0$). With the vlp-$TiO_2$, complete degradation is achieved after 3 hours.
Figure 5:
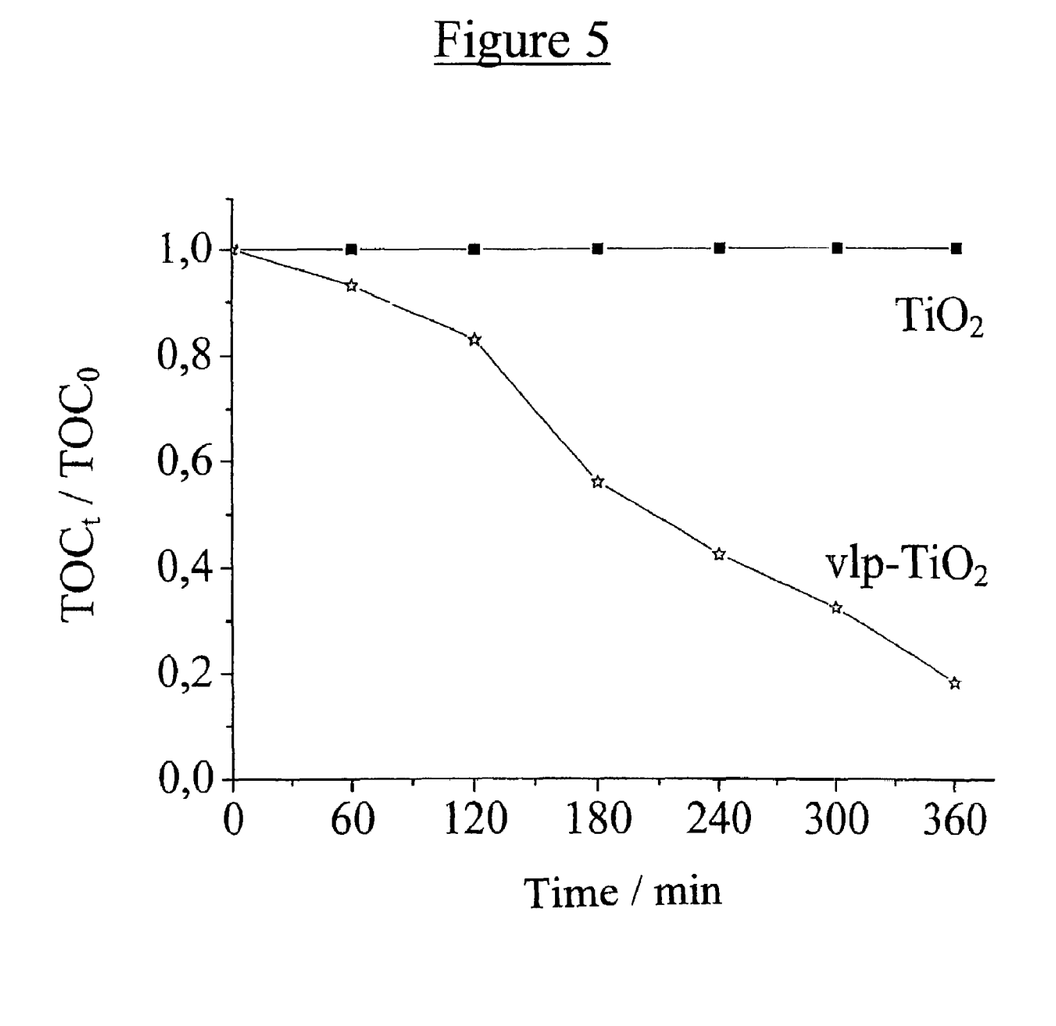
FIG. 5 illustrates the photocatalytic activity of vlp-$TiO_2$ compared to unmodified $TiO_2$ in the degradation of 4-chlorophenol (in the form of a $2.5 \times 10^{-4}$ molar aqueous solution) by means of diffuse, indoor daylight. The diagram presents the decrease in the total content of organic carbon ($TOC_t$) in the solution relative to the starting value ($TOC_0$). Even in low-intensity, diffuse daylight (7 to 10 $W/m^2$ in the range from 400 to 1200 nm), the vlp-$TiO_2$ leads to 80% degradation within six hours.

Even when illuminated by very-low-intensity diffuse daylight (1.6 to <1 $W/m^2$), the vlp-$TiO_2$ still displays significant photoactivity, unlike commercially available $TiO_2$ photocatalysts (Degussa P25, Kemira UV-Titan, Sachtleben Hombikat, Tayca MT-100SA). The degradation rate of $2.5 \times 10^{-4}$ molar 4-chlorophenol solution was measured as described above.

a) Light intensity: 1.6 $W/m^2$; duration: 12 h

| Catalyst | BET surface | Degradation rate |
| --- | --- | --- |
| vlp-$TiO_2$ | 170 $m^2/g$ | 16% |
| P25 | 50 $m^2/g$ | 4% |
| UV-Titan | 20 $m^2/g$ | 5% |
| Hombikat | 240 $m^2/g$ | 9% |
| MT-100SA | 50 $m^2/g$ | 5% | b) Light intensity: <1 $W/m^2$; duration: 24 h

| Catalyst | BET surface | Degradation rate |
| --- | --- | --- |
| vlp-$TiO_2$ | 170 $m^2/g$ | 18% |
| Hombikat | 240 $m^2/g$ | 3% |

FIG. 9 shows a carbon depth profile of the vlp-$TiO_2$, presented as the C/Ti ratio. It was determined by means of ion bombardment ($Ar^+$) and ESCA analysis. The indicated bombardment time of $5\times10^3$ seconds corresponds to a depth of roughly 5 nm.

PRODUCTION

The method according to the invention is based on a titanium compound, which is present in the form of an amorphous, semicrystalline or crystalline titanium oxide or hydrous titanium oxide and/or a titanium hydrate and/or titanium oxyhydrate, and is referred to below as the parent titanium compound.

The parent titanium compound can, for example, be produced during the manufacture of titanium dioxide, either by the sulfate process or by the chloride process. Titanium hydrate, titanium oxyhydrate or metatitanic acid is, for example, precipitated during hydrolysis of titanyl sulfate or titanyl chloride.

The parent titanium compound can be present in the form of a fine-grained solid, or in a suspension of particles with a corresponding solids content of at least 15% by weight, in which context the specific surface area of the solid is at least 50 $m^2/g$ according to BET, preferably roughly 150 to 350 $m^2/g$ according to BET, particularly 150 to 250 $m^2/g$ according to BET. For economical reasons, titanium hydrate from the sulfate process is preferred as the parent titanium compound for industrial implementation of the method according to the invention. This titanium hydrate is advantageously freed of adhering sulfuric acid by prior neutralization and washing, such that the sulfate content of the solid after drying is <1% by weight, calculated as $SO_3$.

Organic carbon containing compounds useful for the invention have a decomposition temperature of 400° C. at most, better <350° C., preferably <300° C. Materials containing carbon, such as wood, carbon black or activated carbon, and especially hydrocarbons with at least one functional group, have proven to be suitable. The functional group can be: OH; CHO; COOH; $NH_x$; $SH_x$; COOR in which R is an alkyl or aryl residue. Suitable are—e e.g. succinic acid, glycerol or ethylene glycol. Sugars or other carbohydrates can also be used, as can organoammonium hydroxides, especially tetraalkylammonium. Mixtures of the compounds mentioned are also suitable. Preferably, water-soluble polyalcohols with a carbon/oxygen ratio of roughly 0.7 to 1.5, preferably of roughly 1, are used, particularly pentaerythritol. The carbon compound can be used in the form of a solid, or as a solution, or as a suspension.

The organic carbon compound should have the greatest possible affinity for the surface of the parent titanium compound, in order to be able to enter into an intimate bond with the latter.

The parent titanium compound is mixed intimately with the organic carbon compound in such a way that the surface of the parent titanium compound is coated with the carbon compound. In this context, the organic carbon compound can be present on the surface of the parent titanium compound in physisorbed or chemisorbed form. The surface of the parent titanium compound can be coated by dissolution of the carbon compound in the suspension of the parent titanium compound, or by mixing of the suspension of the carbon compound with the suspension of the parent titanium compound. Intensive mixing of the carbon compound with a previously dried, powdery parent titanium compound is likewise possible. If titanium hydrate is used, the carbon compound can alternatively also already be admixed to the solution to be hydrolyzed during production of the titanium hydrate.

In the finished mixture of parent titanium compound and carbon compound, the quantity of carbon compound, referred to the parent titanium compound (as solid), is 1 to 40% by weight. If the finished mixture is present in the form of a suspension, it can be dried into a powdery solid prior to further processing. Known methods, such as spray drying or fluidized-bed drying, are suitable for this purpose.

The finished and, where appropriate, predried mixture is treated thermally at temperatures of max. 400° C. The thermal treatment is performed in an oxidizing atmosphere preferably in air or in a mixture of oxygen and air. This process results in decomposition of the organic carbon compound on the surface of the parent titanium compound, and in the release of $H_2O$, $CO_2$ and CO. Although thermal treatment can be performed in batch mode, e.g. in a commercially available laboratory furnace, a continuous process in which a specific temperature profile can be maintained is preferred for economical reasons. The continuous methods open to consideration include all methods with which a corresponding temperature profile and the necessary residence time can be realized. Indirectly and directly heated rotary kilns are particularly suitable units. Continuously operated fluidized-bed reactors, fluidized-bed driers and heated ploughshare mixers can also be used. The three last-named units can also be operated in batch mode.

Thermal treatment is preferably performed in such a way that a product (vlp-$TiO_2$) is obtained which has a carbon content of 0.05 to 4.0% by weight, preferably 0.05 to 2.0% by weight, particularly preferably 0.3 to 1.5% by weight, and especially 0.4 to 0.8% by weight. A change of color, from white to brown and finally to beige, takes place in the course of the thermal treatment. The end product is characterized by a beige to slightly yellowish-brownish color. It is characterized by the fact that the carbon can be detected in amorphous and polycrystalline regions of the surface layer, as well as on the surface itself. The product is photoactive in visible light.

Following thermal treatment, the product is disagglomerated by known methods, e.g. in a pin mill, jet mill or opposed jet mill. In the case of powdery, predried mixtures, thermal treatment mostly leads to agglomerate-free products not requiring further milling. The fineness of grind to be achieved depends on the particle size of the parent titanium compound. The fineness of grind or specific surface area of the product is only marginally lower, but in the same order of magnitude as that of the educt. The targeted fineness of grind of the photocatalyst depends on the field of application of the photocatalyst. It is usually in the same range as for $TiO_2$ pigments, although it can also be lower or higher. The specific surface area according to BET is in the region of 100 to 250 m²/g, preferably 130 to 200 m²/g, particularly 130 to 170 m²/g.

EXAMPLES

The invention is described more precisely on the basis of the following examples, although this is not intended to restrict the scope of the invention.

Example 1

An aqueous titanium oxyhydrate paste (35% by weight solids), produced by the sulfate process, is diluted with sufficient distilled water at room temperature to obtain a stirrable suspension. The solids content is in the region of 20 to 25%. NaOH solution (36% by weight) is added until a pH value between 6.0 and 7.0 is obtained. The suspension is subsequently filtered and washed with distilled water until the $SO_3$ content measured on the dried residue is below 1% by weight. The titanium oxyhydrate neutralized and washed in this way is subsequently again diluted into a stirrable suspension (25% solids) with distilled water, and 12% by weight succinic acid, referred to the solid, are added. The succinic acid is added to the suspension in solid form, and the suspension stirred until the succinic acid has dissolved completely. The suspension is heated to roughly 60° C. to improve the solubility of the succinic acid. While stirring, the suspension prepared in this way is dried under a surface evaporator (IR radiator) to such an extent that a pasty mass is obtained from the suspension. The pasty mass is subsequently dried in a laboratory drying oven at 150° C. until the solids content is >98%.

300 g of the dried titanium oxyhydrate/succinic acid mixture are finely crushed (e.g. by grinding in a mortar and sieving), and the resultant powder is placed in a laboratory furnace at 290° C. in a quartz dish with cover. At intervals of 1 to 2 hours, the quartz dish is removed and the powder mixed again. After 13 to 15 hours in the laboratory furnace, the color of the powder has changed from initially yellowish to gray-black and finally to yellowish-brown. The thermal treatment to obtain vlp-$TiO_2$ is complete when the carbon content has decreased from the initial 5 to 5.5% by weight to roughly 0.65 to 0.80% by weight.

The photocatalyst is subsequently disagglomerated and analyzed to determine its carbon content, optical properties, BET surface and photoactivity.

Example 2

Procedure similar to that in Example 1, except that 12% by weight pentaerythritol are added to the titanium oxyhydrate suspension as the solid.

Example 3

Procedure similar to that in Example 2, except that 5% by weight pentaerythritol are added to the titanium oxyhydrate suspension as the solid.

Example 4

A titanium oxyhydrate/pentaerythritol suspension containing 5% by weight pentaerythritol is prepared as described in Example 1. As a modification of Example 1, the thermal treatment of the suspension obtained in this way is performed in a continuously operated rotary kiln, as follows:

The rotary kiln is operated in counter-current mode and heated directly by means of a gas burner. The naked flame of the gas burner is protected by a fire tube, thus preventing direct contact with the product (vlp-$TiO_2$). The heated kiln length is 7 m, and the inside diameter 0.3 m. The suspension is finely sprayed in at the kiln inlet. The suspension is added at a feed rate of 40 kg/h. Chains installed in the kiln inlet ensure good turbulence, and thus rapid drying and subsequent comminution of the dried material. The time required to pass through the continuously operated rotary kiln is 1 hour. The kiln temperature in the area of the outlet is regulated to 260° C. by means of the gas volume at the burner. The vlp-$TiO_2$ obtained at the outlet of the kiln has the form of a fine powder with a yellowish-brown color. The vlp-$TiO_2$ is subsequently disagglomerated in a laboratory mixer (Braun, MX 2050) and analyzed to determine its carbon content, optical properties, BET surface and photoactivity.

Example 5

Procedure similar to that in Example 4, except that the kiln temperature in the area of the outlet is regulated to 280° C. by means of the gas volume at the burner.

Example 6

A titanium oxyhydrate/pentaerythritol suspension containing 5% by weight pentaerythritol is prepared as described in Example 1. As a modification of Example 1, the suspension is predried in an electrically heated furnace to obtain a powdery solid with a residual moisture content of 22%. The thermal treatment of the predried, powdery feed material is performed in a continuously operated, indirectly heated rotary kiln, as follows:

The rotary kiln is operated in co-current mode and heated electrically in three zones. The total heated kiln length is 2,700 mm, and the inside diameter 390 mm. The powdery solid is fed to the kiln inlet via a metering screw. Chains installed over the full length of the rotary kiln ensure homogeneous distribution in the kiln and prevent caking on the kiln wall. The feed rate is 25 kg solid per hour. The time required to pass through the continuously operated rotary kiln is 0.5 hours. The kiln temperature is regulated electrically in three heating zones. The temperature of each of the three heating zones can be controlled individually. The vlp-$TiO_2$ obtained at the outlet of the kiln has the form of a beige-colored, fine powder. The vlp-$TiO_2$ is subsequently disagglomerated in a laboratory mixer (Braun, MX 2050) and analyzed to determine its carbon content, optical properties, BET surface and photoactivity.

Comparative Example

A $TiO_2$ pigment (anatase) with a BET surface of roughly 10 m²/g (commercial product Kronos 1000) is mixed with 12% pentaerythritol and thermally treated as in Example 2.

| Example | Organic substance | Thermal treatment °C. | Time (h) | Analysis of the vlp-TiO$_2$ C content (%) | PLV test L* | b* | a* | BET m$^2$/g | Photoactivity Degradation of 4-CP in 120 min. (%) |
|---|---|---|---|---|---|---|---|---|---|
| 1 | Succinic acid | 290 | 13 | 0.79 | 85.4 | 9.85 | 1.63 | 164 | 48 |
| 2 | Pentaerythritol | 290 | 28 | 0.75 | 86.9 | 10.08 | 1.53 | 158 | 50 |
| 3 | Pentaerythritol | 290 | 10 | 0.76 | 83.7 | 10.03 | 1.59 | 140 | 63 |
| 4 | Pentaerythritol | 260* | 1** | 0.92 | 85.1 | 11.7 | 1.2 | 152 | 58 |
| 5 | Pentaerythritol | 280* | 1** | 0.50 | 85.8 | 9.4 | 2.2 | 160 | 68 |
| 6 | Pentaerythritol | 300*** | 0.5** | 0.78 | 83.0 | 11.0 | 2.6 | 167 | 86 |
| Compar. example | Pentaerythritol | 290 | 42 | 0.82 | 74.7 | 9.12 | 2.50 | 11.6 | <5 |

*Maximum temperature, measured at the outlet of the rotary kiln
**Time required for the feed material to pass through the rotary kiln
***Temperature of the three heating zones, measured in the region of the heating elements The analytical data and photoactivity of the vlp-TiO$_2$ according to the invention are compiled in the table.

In addition to good optical values (PLV test), vlp-TiO$_2$ produced from titanium hydrate (Examples 1 to 6) displays excellent photocatalytic activity in the visible spectral range. The use of an anatase pigment instead of titanium hydrate results in a product with no notable photoactivity (comparative example).

Example 7

5 g titanium dioxide (commercial product TRONOX Titanhydrat-0 from Kerr-McGee Pigments GmbH) are suspended in 20 ml distilled water at room temperature, mixed with 5 ml ethylene glycol (commercial product from FLUKA AG) and treated for 30 minutes in an ultrasonic bath (Sonorex Super RK 106 from Bandelin Electronic, Berlin; 35 kHz, 120 W r.m.s. HF output). Following magnetic stirring overnight, the solvent is removed, preferably in a vacuum, the residue dried at 100 to 200° C., preferably at roughly 200° C., for at least 12 hours, then heated to 300° C. in a closed vessel within one hour, and subsequently maintained at this temperature for a further three hours. A change in the color of the powder, from white to dark-brown and then beige, can be observed in this process. Heating for longer periods results in colorless, inactive powders.

The elementary analysis of the product yields 2.58% by weight carbon, 0.02% by weight nitrogen, and 0.40% by weight hydrogen. Unmodified TiO$_2$ contains 0.07% by weight C, 0.0% by weight N and 0.0% by weight H.

Example 8

To strip the carbon compound on the surface, 5 g vlp-TiO$_2$ are stirred in 100 ml of a 2 M sodium hydroxide solution (pH 12) overnight. A brownish-yellow extract and a whitish residue with hardly any color are obtained by centrifuging, the latter being dried at 100° C. The powder obtained in this way demonstrates no activity in the degradation of 4-chlorophenol in visible light. However, if the powder is combined with the extract again and heated slightly, preferably to roughly 200° C., it possesses the same activity in the degradation reaction as the untreated (unleached) vlp-TiO$_2$.

Example 9

Figure 6:
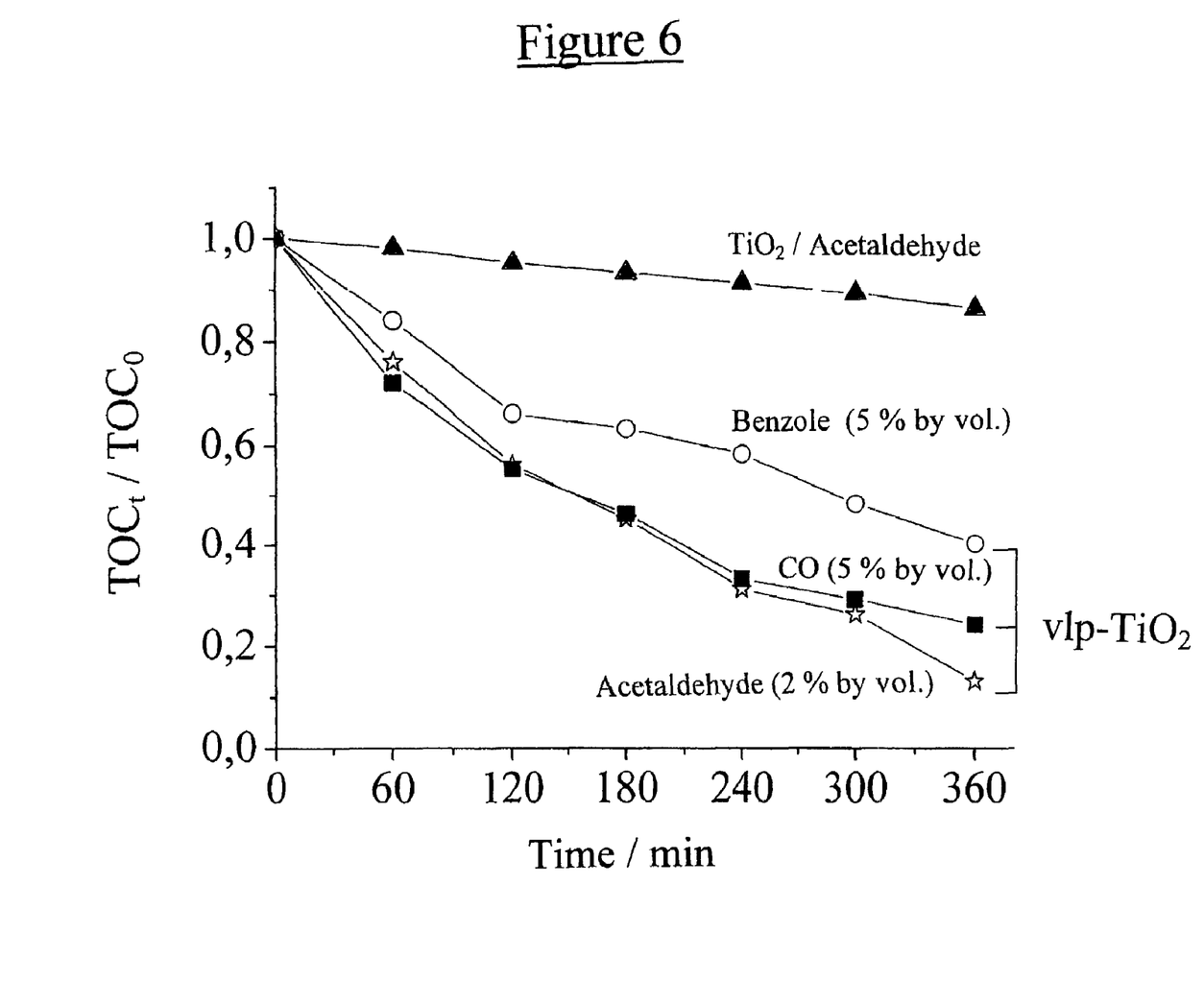
FIG. 6 illustrates the photocatalytic activity of vlp-$TiO_2$ compared to unmodified $TiO_2$ in the degradation of benzole (5% by volume), acetaldehyde (2% by volume) and carbon monoxide (5% by volume) by diffuse, indoor daylight. The reaction vessel used is a 1-liter, round-bottom flask, fitted with a filter-paper disk (d=15 cm) coated with 12 mg titanium dioxide. The diagram presents the decrease in the total content of organic carbon ($TOC_t$) in the atmosphere relative to the starting value ($TOC_0$). The curves show the degradation of benzole, acetaldehyde and carbon monoxide by the vlp-$TiO_2$ according to the invention, as well as the degradation of acetaldehyde by unmodified titanium dioxide.
Figure 7:
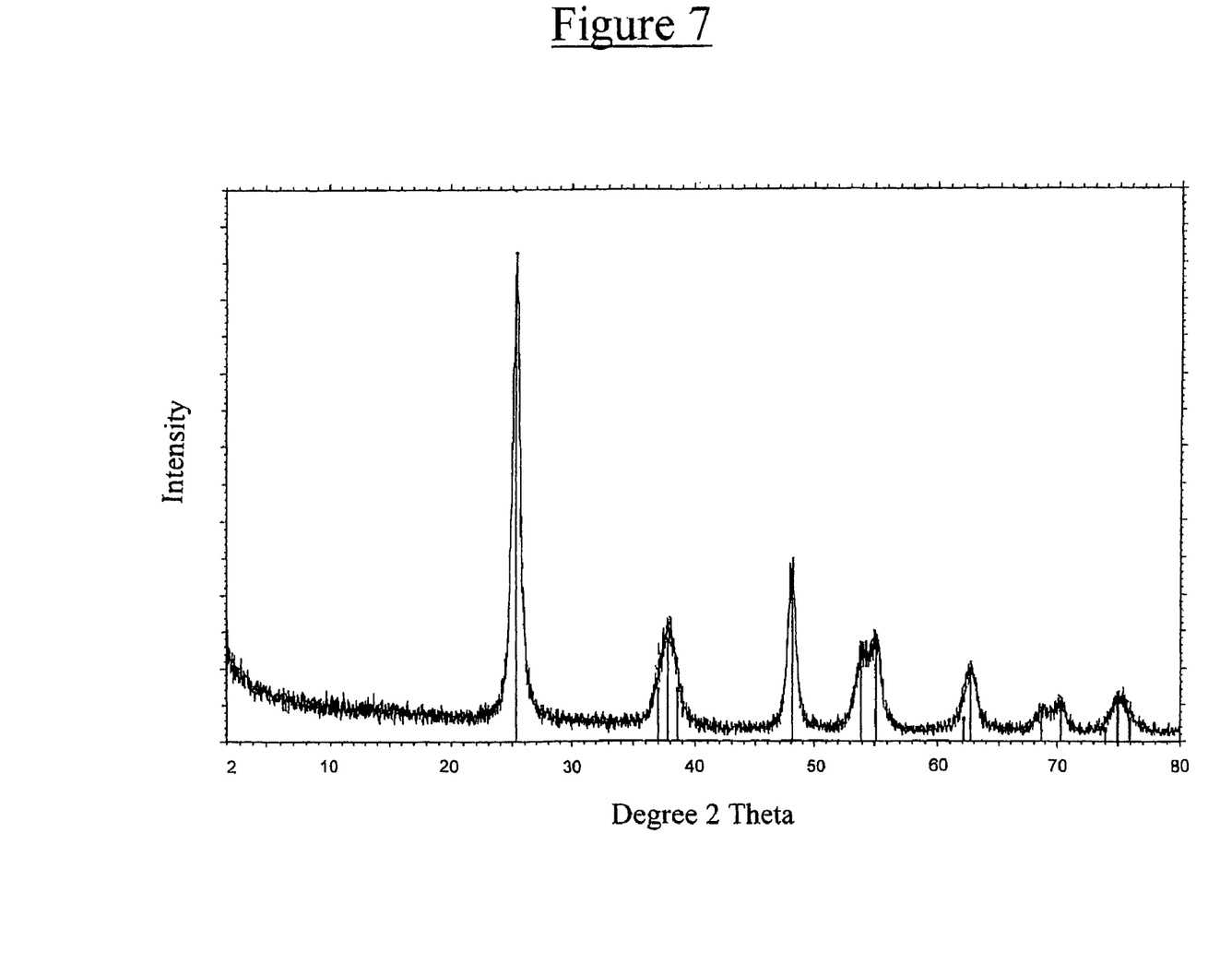
FIG. 7 shows an X-ray powder diffractogram of the vlp-$TiO_2$, which displays only anatase reflections. The crystallite size calculated by the Scherrer method is in the region of 10 nm.
Figure 8:
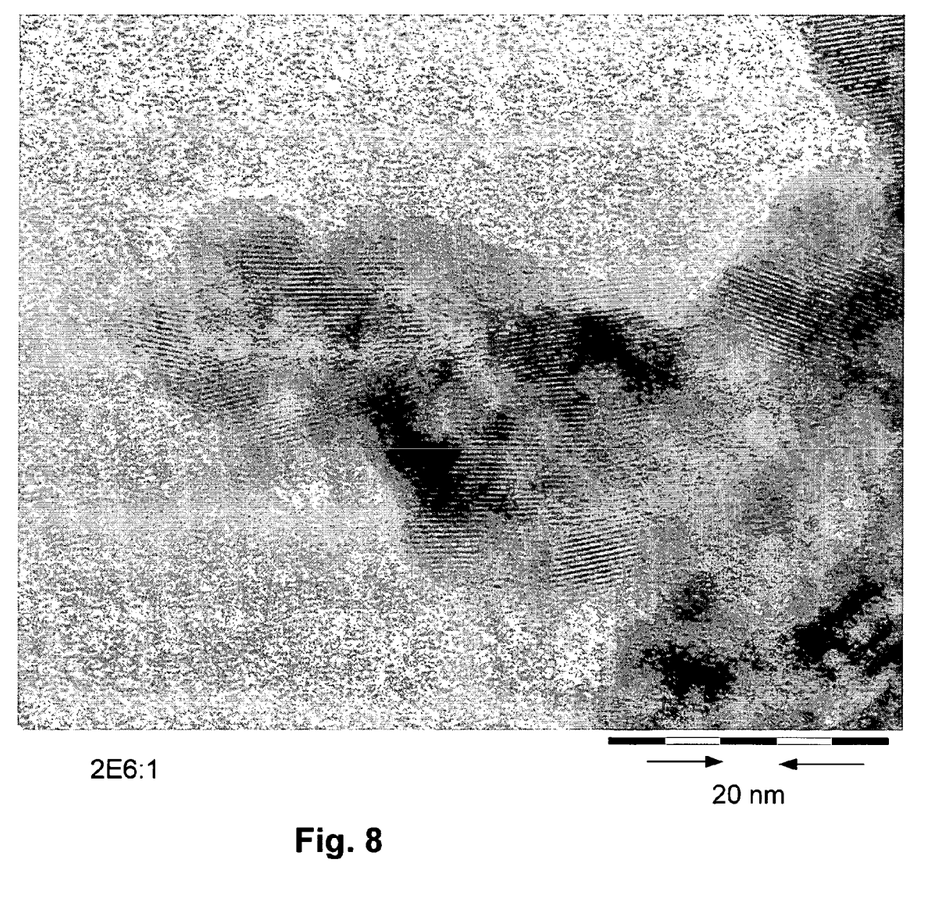
FIG. 8 shows a photograph of vlp-$TiO_2$, produced by means of high-resolution transmission electron microscopy (HTEM), with the lattice lines of the crystallites. The crystallite size can be estimated as having an order of magnitude of 10 nm.
Figure 9:
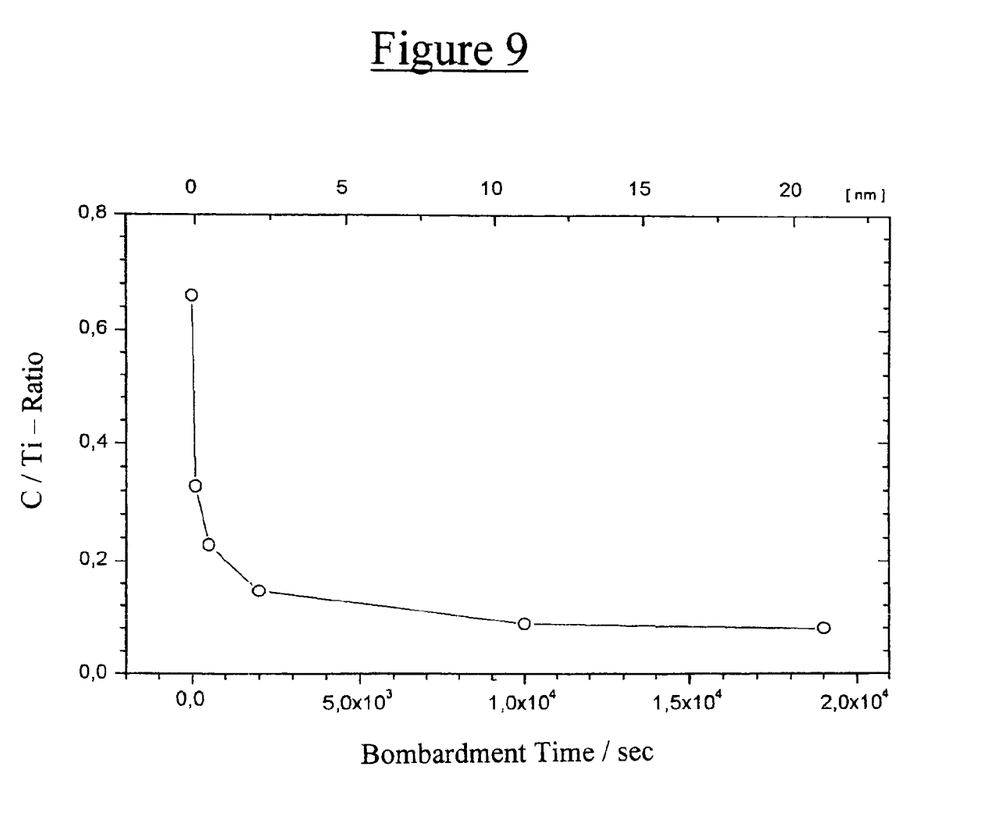

To coat a plastic sheet, a powder produced according to Example 6 is suspended in a liquid, such as methanol or ethanol, in the ultrasonic bath, and the resultant suspension is applied to the sheet as thinly as possible by means of a spray bottle. Following subsequent drying at 343 K, the coating operation can be repeated until the required film thickness is reached. Instead of the plastic sheet, it is also possible to use a different substrate, such as paper (see experiment according to FIG. 6) or aluminum (see under Measuring methods h): "dip-coating").

Measuring Methods a) Determination of the Optical Values (PLV Test)

The method is used to determine the optical values for the brightness L*, tone a* and tone b* of the vlp-TiO$_2$. Under defined conditions, a powder tablet is produced from the vlp-TiO$_2$ to be tested, using a small hydraulic press from MATRA, Frankfurt. The HUNTERLAB Tristimulus Colorimeter is subsequently used to determine the reflectance values on the powder tablet. The vlp-TiO$_2$ is ground prior to production of the tablet. To this end, 100 g of the vlp-TiO$_2$ obtained are put into a commercially available mixer (manufacturer: Braun; model: MX 2050) and ground 12 times for 5 seconds. After each grinding step, the mixer is opened and the powder thoroughly stirred again. A sheet of white paper, matt on both sides, is placed on a base plate with a circular depression, and a metal ring (height 4 cm, diameter 2.4 cm) is pressed into the depression with the press. Roughly 25 g of the ground vlp-TiO$_2$ are poured into the metal ring, shaking and tapping it gently. The powder is compacted at a pressure of 2 to 3 kN. The pressing operation is performed a second time until the targeted operating pressure of 15 kN is reached.

The metal ring is carefully turned and pulled to separate it from the base plate. The paper between the base plate and the ring is removed. The ring now contains the tablet, which is used for the measuring procedure on the HUNTERLAB colorimeter. The measured values of L*, a* and b* are read off directly on the colorimeter.

b) Determination of the Photoactivity (Pollutant Degradation)

Figure 10:
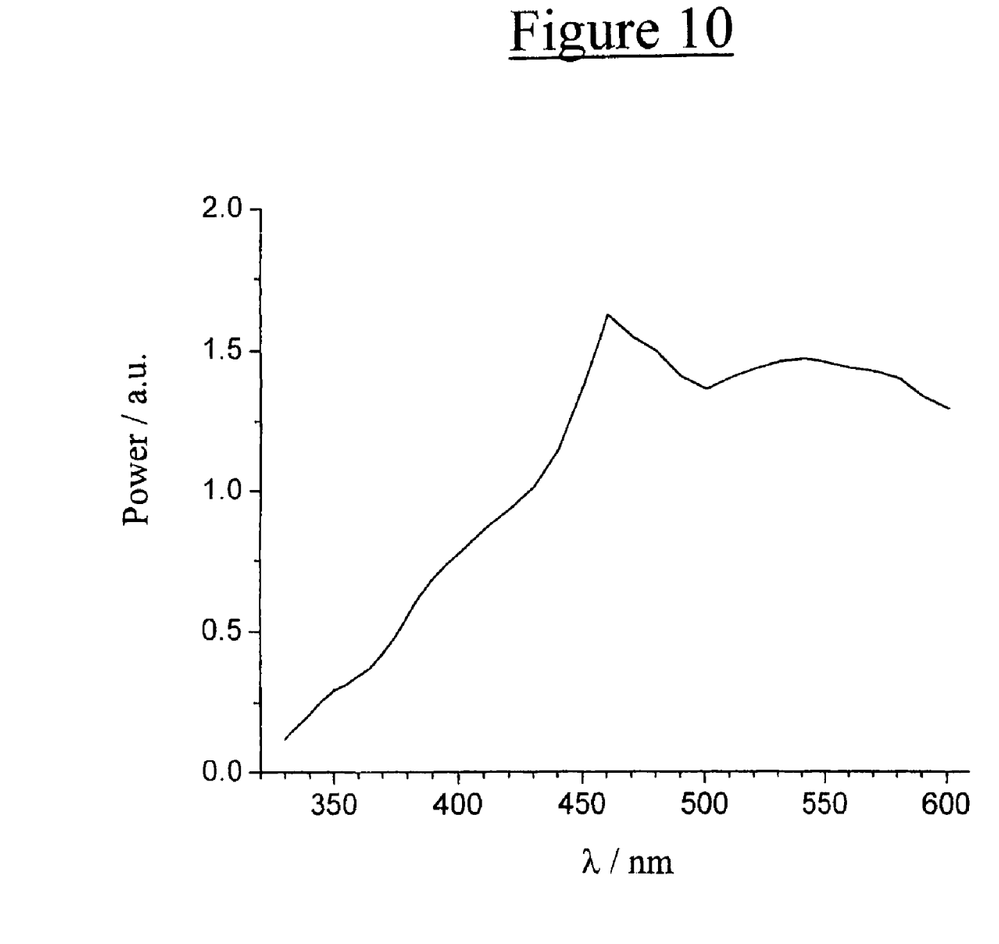
Figure 11:
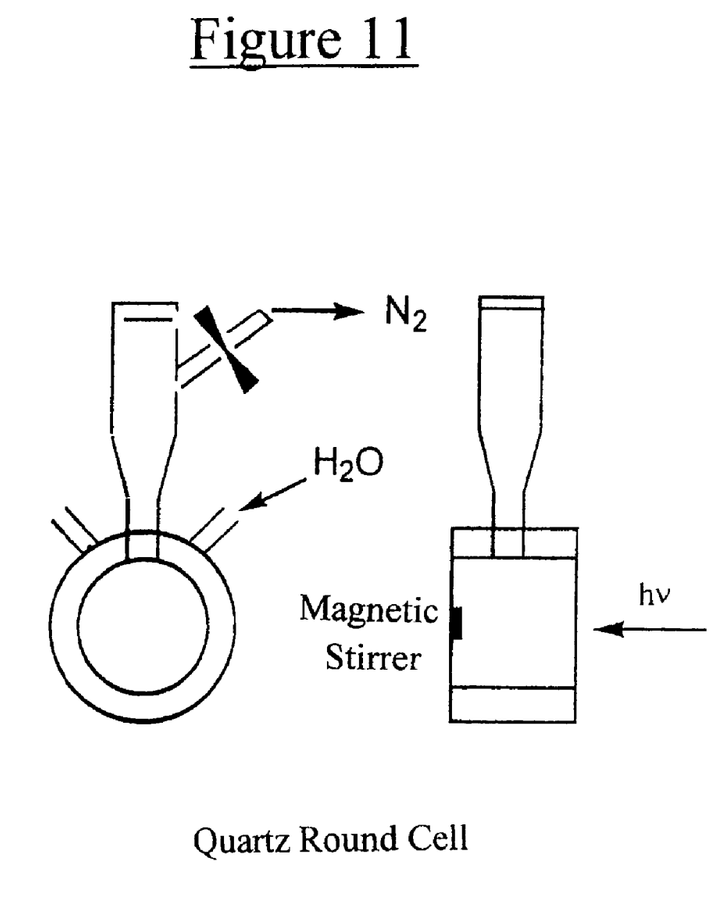

In artificial visible light:

15 mg of the vlp-TiO$_2$ are dispersed in 15 ml of a 2.5×10$^{-4}$ molar solution of 4-chlorophenol in an ultrasonic bath for 10 minutes, and subsequently exposed in a water-cooled round cell on an optical bench. Exposure for determining the photoactivity is performed using an Osram XBO 150 W short-arc xenon lamp installed in a focusing lamp housing (AMKO, model A1020, focal length 30 cm). The spectrum of this lamp is illustrated in FIG. 10. The reactions are performed in a 15 ml water-cooled round cell with an inside diameter of 30 mm and a layer thickness of 20 mm. The reaction suspension can be stirred with a laterally mounted stirrer motor and stirrer magnet. The round cell is illustrated in FIG. 11. The cell is fixed at the focus of the lamp. The light is focused in such a way that only the reaction chamber of the cell is irradiated. All components are firmly mounted on an optical bench. To eliminate UV light, a cut-off filter transparent at $\lambda \geqq 455$ nm (manufacturer: Schott) is inserted in the beam path. To prevent possible heating of the reaction chamber as a result of exposure, an IR filter is additionally mounted in the beam path. This consists of a water-filled cylinder (diameter 6 cm, length 10 cm).

The decline in the 4-chlorophenol concentration is monitored by means of UV spectroscopy ($\lambda$=224 nm) or, in the event of degradation (oxidation), by measuring the total organic carbon content (TOC value).

In diffuse, indoor light:

50 mg of the vlp-$TiO_2$ are dispersed in 50 ml of a $2.5 \times 10^{-4}$ molar solution of 4-chlorophenol in an ultrasonic bath for 10 minutes, and subsequently exposed to indoor daylight in an Erlenmeyer flask (100 ml) while stirring.

Degradation of acetaldehyde gas, benzole vapor and carbon monoxide:

Two round filters, coated with the vlp-$TiO_2$ on both sides (paper, d=15 cm, 12 mg catalyst per filter), are put into a round-bottom flask (1 l) filled with air-saturated acetaldehyde gas (2% by volume), or with benzole vapor (5% by volume), or with carbon monoxide. The flask is subsequently exposed to daylight in the laboratory, and the decrease in the pollutants and the formation of carbon dioxide are monitored by means of IR spectroscopy.

c) Determination of the Carbon Content

The carbon content is measured as the total organic carbon content (TOC), using the LECO C-200 carbon analyzer. The measuring method is based on combustion of the organic substance contained in the $TiO_2$ in an induction furnace under oxygen gas, and subsequent determination of the carbon dioxide formed by means of IR detection. The weight of the $TiO_2$ sample is approx. 0.4 g.

d) Determination of the Specific Surface Area According to BET (Brunauer-Emmett-Teller)

The BET surface is measured with a Tristar 3000 from Micromeritics in accordance with the static volumetric principle.

e) XPS Measurements

The equipment used to measure the bond energies was the Phi 5600 ESCA spectrometer (pass energy of 23.50 eV, Al standard, 300.0 W, 45,0°).

f) ESR Measurements

A Bruker Elexys 580 Spectrometer X-band (9.5 GHz) was used to measure the electron spin resonance spectra. The sample was evacuated to $10^{-5}$ Torr, filled with helium to a pressure of $10^{-2}$ Torr and subsequently melted down. The measurement was performed under the following conditions:

Magnetic field modulated with 100 Hz. RF power: 0.0002 to 1 mW. Field: 3340 to 3500 G. Sweep width: 100 to 500 G. Conversion time: 81.92 ms. Time constant: 40.96 ms. Modified amplitude: 0.2 to 13 G, Temperature: 5 K. The g value is determined by means of a Hall probe.

g) Measurement of the Diffuse Reflection Spectra (Kubelka-Munk Function)

The diffuse reflection spectra of the powders were measured using a Shimadzu UV-2401PC UV/Vis spectrometer equipped with an Ulbricht sphere. The white standard used was barium sulfate, with which the powders were ground in a mortar prior to measurement. The Kubelka-Munk function is proportional to the absorbancy.

h) Superhydrophilic Properties

To measure the contact angle of water, both vlp-$TiO_2$ and unmodified $TiO_2$ were suspended in distilled water, applied to a 5×5 cm aluminum plate by "dip coating", and calcined at 400° C. for 1 hour. After storage in daylight, a contact angle of 21° was measured for the unmodified titanium dioxide, in contrast to only 8° for the vlp-$TiO_2$. The contact angle for the uncoated aluminum plate was 91°.

Obviously, many modifications and variations of the present invention are possible in light of the above teachings. It is therefore to be understood that, within the scope of the appended claims, the invention may be practiced otherwise than as specifically described.

We claim:

1. A material, comprising;
a photocatalyst based on carbon containing titanium dioxide particles, wherein the material shows significant light absorption for light of wavelength $\lambda$>400 nm compared to pure titanium dioxide particles, and wherein the material is characterized by an electron spin resonance (ESR) spectrum, measured at a temperature of 5 K, which displays only one significant signal in the g value range from 1.97 to 2.05.

2. The material of claim 1, wherein the one significant signal in the ESR spectrum occurs at a g value of 2.002 to 2.004.

3. The material of claim 1, wherein the Kubelka-Munk function F(R∞), which is proportional to the absorbancy, at 500 nm is roughly 50% the value at 400 nm, and at 600 nm is roughly 20% of the value at 400 nm.

4. The material of claim 1, wherein the specific surface of the material is greater than 100 $m^2$/g.

5. The material of claim 3, wherein the specific surface area of the material according to BET is 100 to 250 $m^2$/g.

6. The material of claim 1, wherein the material is characterized by a strong absorption band at a bond energy of 285.6 eV in the X-ray photoelectron spectrum (XPS), referred to the O(1s) band at 530 eV.

7. The material of claim 1, wherein the Kubelka-Munk function F(R 4), which is proportional to the absorbancy, at 500 nm is roughly 50% the value at 400 nm, and at 600 nm is roughly 20% of the value at 400 nm.

8. The material of claim 1, wherein the photoactivity is at least 20%.

9. The material of claim 8, wherein the photoactivity is at least 40%.

10. The material of claim 2, wherein the carbon content is in the range from 0.05 to 2% by weight.

11. The material of claim 10, wherein the carbon content is in the range from 0.3 to 1.5% by weight.

12. The material of claim 11, wherein the carbon content is in the range from 0.4 to 0.8% by weight.

13. The material of claim 1, wherein the specific surface area of the material according to BET is 100 to 250 $m^2$/g.

14. The material of claim 1, wherein the material does not display significant carbonate bands, either in the X-ray photoelectron spectrum or in the infrared spectrum.

15. The material of claim 1, wherein the material is incorporated into materials chosen from the group consisting of plastics, plastic sheeting, fibers, paper, and road surfacing material.

16. The material of claim 1, wherein the material is incorporated into construction materials chosen from the group consisting of prefabricated concrete elements, concrete paving stones, roof tiles, ceramics, decorative tiles, wallpapers, fabrics, and panels and cladding elements for ceilings and walls in indoor and outdoor areas.

17. The material of claim 1, wherein the material is incorporated in devices for air purification and air sterilization and for water purification especially for antibacterial and antiviral purposes.

18. The material of claim 1, wherein the material is incorporated in photovoltaic cells and in devices for photolysis.

19. A material, comprising;
a photocatalyst based on carbon containing titanium dioxide particles, wherein the material shows significant light absorption for light of wavelength $\lambda > 400$ nm compared to pure titanium dioxide particles, and wherein the material is characterized by an electron spin resonance (ESR) spectrum, measured at a temperature of 5 K, which displays only one significant signal in the g value range from 1.97 to 2.05, and wherein the material does not display significant carbonate bands, either in the X-ray photoelectron spectrum or in the infrared spectrum, wherein the carbon content is in the range from 0.05 to 4% by weight, and wherein the carbon content of the $TiO_2$ particles is only embedded in a surface layer of the $TiO_2$ particles.

* * * * *